(12) United States Patent
Guo

(10) Patent No.: US 8,081,450 B2
(45) Date of Patent: Dec. 20, 2011

(54) ELECTRONIC DEVICE

(75) Inventor: Shi-Kun Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 340 days.

(21) Appl. No.: 12/468,052

(22) Filed: May 19, 2009

(65) Prior Publication Data

US 2009/0290295 A1   Nov. 26, 2009

(30) Foreign Application Priority Data

May 23, 2008   (CN) .......................... 2008 1 0301729

(51) Int. Cl.
*H05K 5/00* (2006.01)
*H05K 7/00* (2006.01)

(52) U.S. Cl. ......... 361/679.56; 361/679.55; 361/679.01; 455/575.1; 455/575.4

(58) Field of Classification Search ............. 361/679.01, 361/679.55, 679.56; 455/575.1, 575.4
See application file for complete search history.

(56) References Cited

U.S. PATENT DOCUMENTS

| 2005/0124398 | A1 | 6/2005 | Lee et al. |
| 2006/0120029 | A1* | 6/2006 | Ryu et al. ...................... 361/680 |
| 2008/0075274 | A1 | 3/2008 | Huang et al. |

FOREIGN PATENT DOCUMENTS

| CN | 2298624 Y | 11/1998 |
| CN | 1627772 A | 6/2005 |
| JP | 3-288495 A | 12/1991 |

* cited by examiner

*Primary Examiner* — Anthony Haughton
(74) *Attorney, Agent, or Firm* — Altis Law Group, Inc.

(57) ABSTRACT

An electronic device includes a main body and a lid body. The main body includes a fixing portion and a rotating component received in the fixing portion. The lid body has a guide arm accommodating the fixing portion and engaging with the fixing portion via the rotating component.

13 Claims, 6 Drawing Sheets

ELECTRONIC DEVICE

BACKGROUND

1. Technical Field

The present disclosure relates to electronic devices, and particularly to a slide-type electronic device.

2. Description of Related Art

Slide-type electronic devices have become increasingly popular. A slide-type electronic device often includes a main body and a lid body slidable with respect to the main body by means of a sliding mechanism.

The sliding mechanism includes two guide rails formed symmetrically on opposite sides of the main body, and two guide arms formed symmetrically on opposite sides of the lid body corresponding to the two guide rails. Each guide arm defines a guide slot. Each guide rail is received in the corresponding guide slot and slidable relative to the corresponding guide arm.

However, the size of each guide rail is slightly smaller than that of the corresponding guide slot, that is to say there is a small clearance between the guide rail and the corresponding guide arm. Therefore, as the contacting area between the guide rail and the corresponding guide slot is bigger, a sliding friction between the guide rail and the guide slot is larger, and the guide arm and the guide rail tends to wear and tear easily.

Therefore, there is room for improvement within the art; an electronic device with a new slide-type mechanism is desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
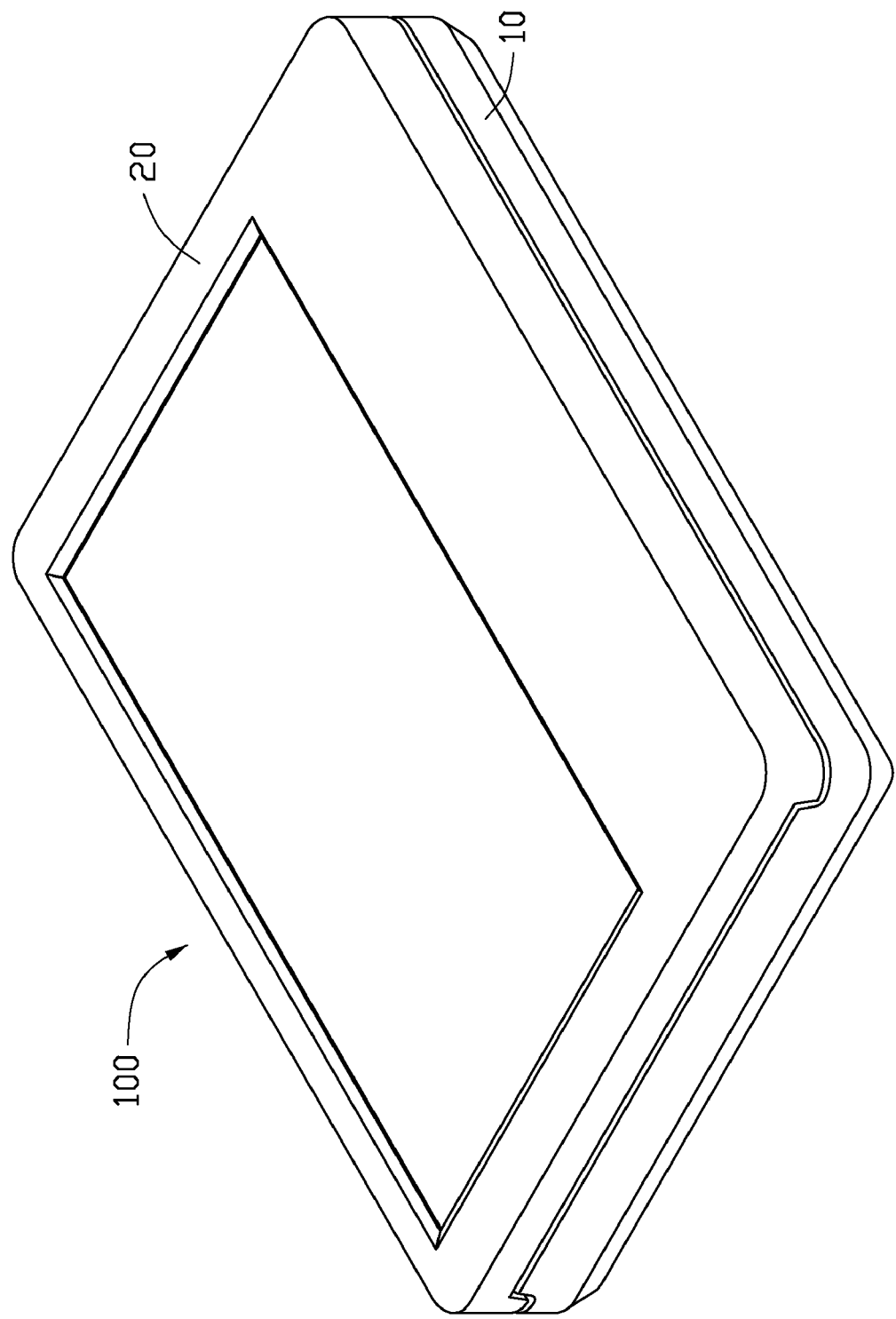
FIG. 1 is an isometric view of an electronic device in accordance with an exemplary embodiment in a state.
Figure 2:
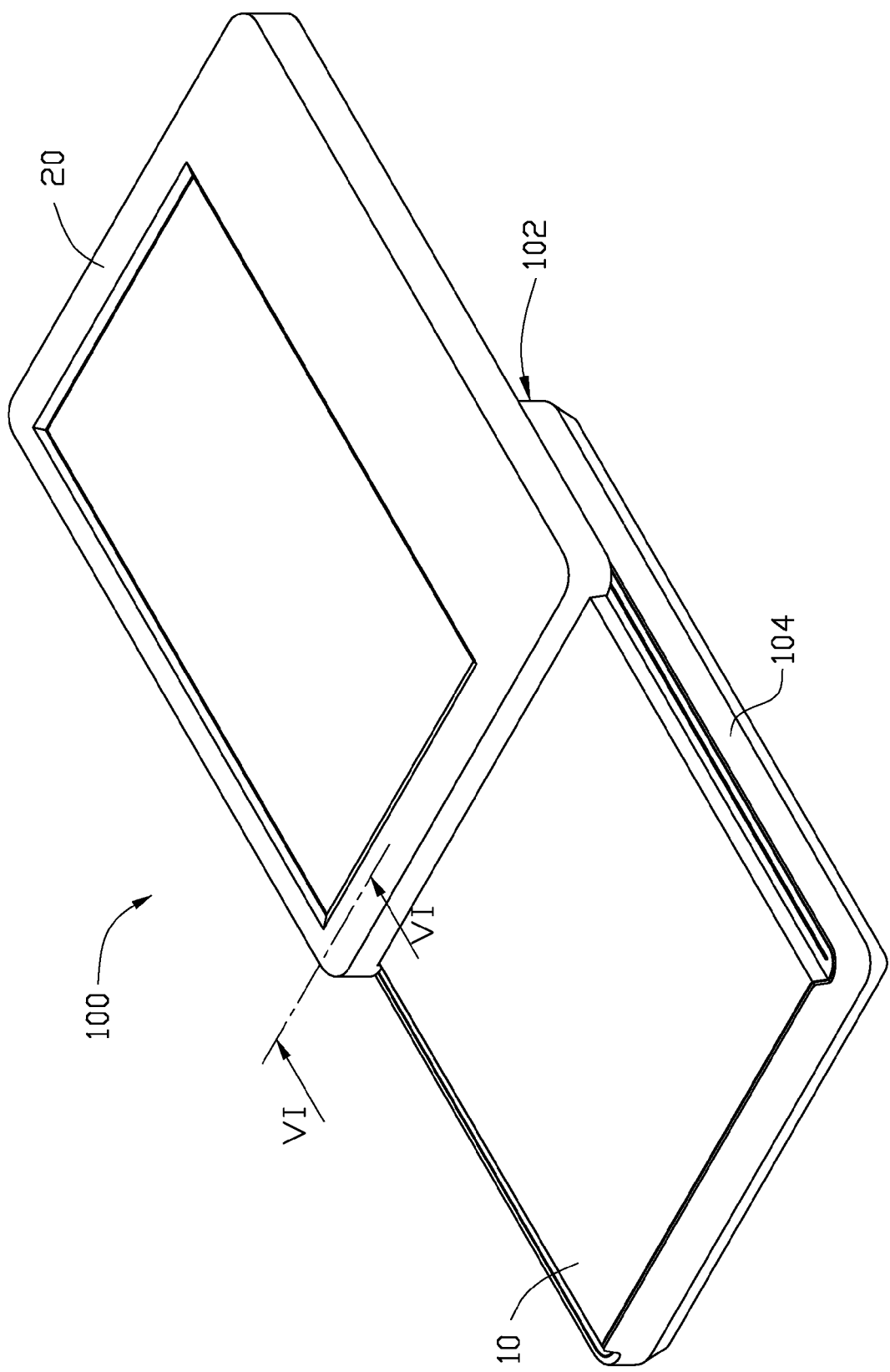
FIG. 2 is an isometric view of the electronic device of FIG. 1 in another state.

Referring to FIGS. 1 and 2, an electronic device 100 includes a main body 10 and a lid body 20 mounted on the main body 10. The lid body 20 is slidable with respect to the main body 10 so as to switch between a first state and a second state. In the first state, the lid body 20 fully covers the main body 10. In the second state, most portions of the lid body 20 extend out from a first side 102 of the main body 10.

Figure 3:
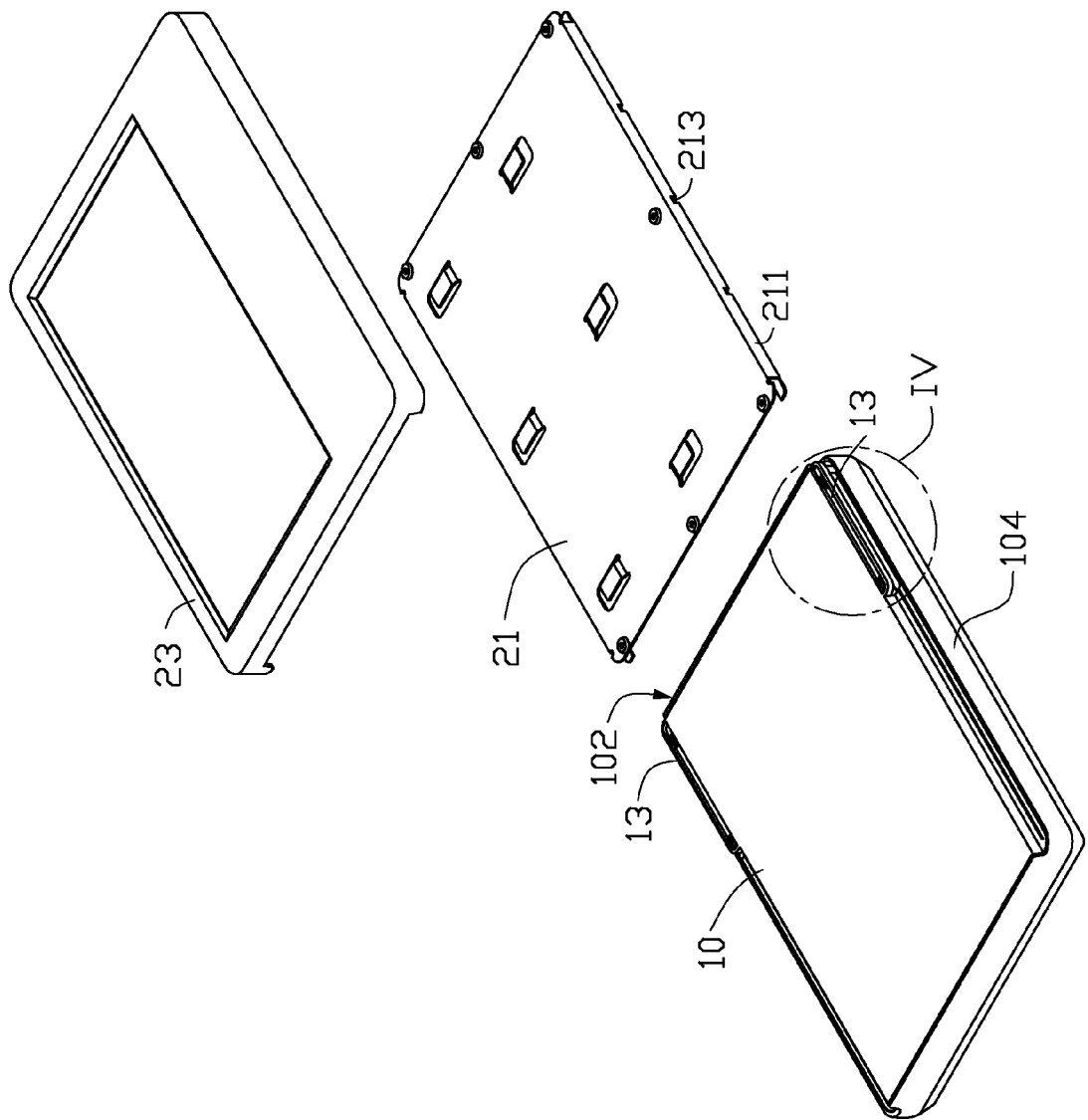
FIG. 3 is an exploded view of the electronic device of FIG. 1 from one side.
Figure 4:
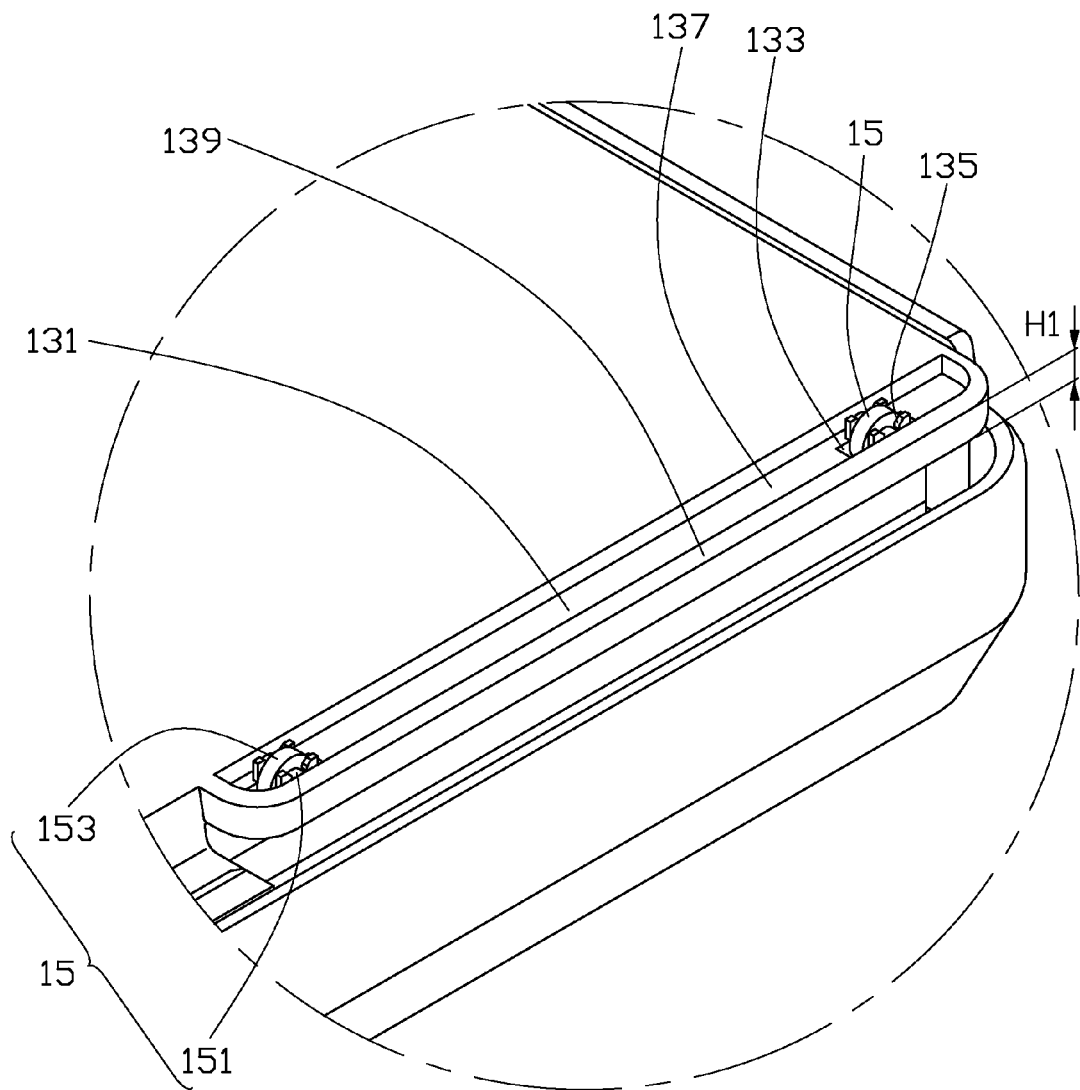
FIG. 4 is an enlarged view of a circled portion IV of FIG. 3.

Referring to FIGS. 3 and 4, the main body 10 is substantial rectangular. The main body 10 includes the first side 102, two second sides 104 on opposite sides of the main body 10 perpendicularly connected with two ends of the first side 102. Two fixing portions 13 are symmetrically formed on the second sides 104 of the main body 10 correspondingly. The fixing portions 13 extend along the second sides 104 correspondingly and are adjacent to the first side 102. Each fixing portion 13 includes four sidewalls 139 interconnected with each other and a bottom wall 137 attached to the four sidewalls 139. The sidewalls 139 and the 137 cooperatively form a guide slot 131. A pair of fixing holes 133 is defined at opposite ends of the bottom wall 137 correspondingly.

Four pairs of hooks 135 are arranged on opposite sidewalls 139 of each fixing portion 13 correspondingly. Each guide slot 131 is between the corresponding two pairs of hooks 135.

Two wheels 15 are received in the two guide slots 131 of each fixing portion 13 correspondingly. Each wheel 15 has a base disk 153 received in the corresponding guide slot 131 and a pair of shafts 151 protruding from opposite sides of the base disk 153. Each pair of shafts 151 is fastened between two pairs of hooks 135 correspondingly to fasten each wheel 15 to each corresponding fixing portion 13. A diameter of the base disk 153 of each wheel 15 is greater than height H1 of the sidewalls 139 of corresponding fixing portion 13, thus opposite ends of the base disk 153 of each wheel 15 received in the fixing hole 133 extend out of the fixing portion 13 correspondingly.

Figure 5:
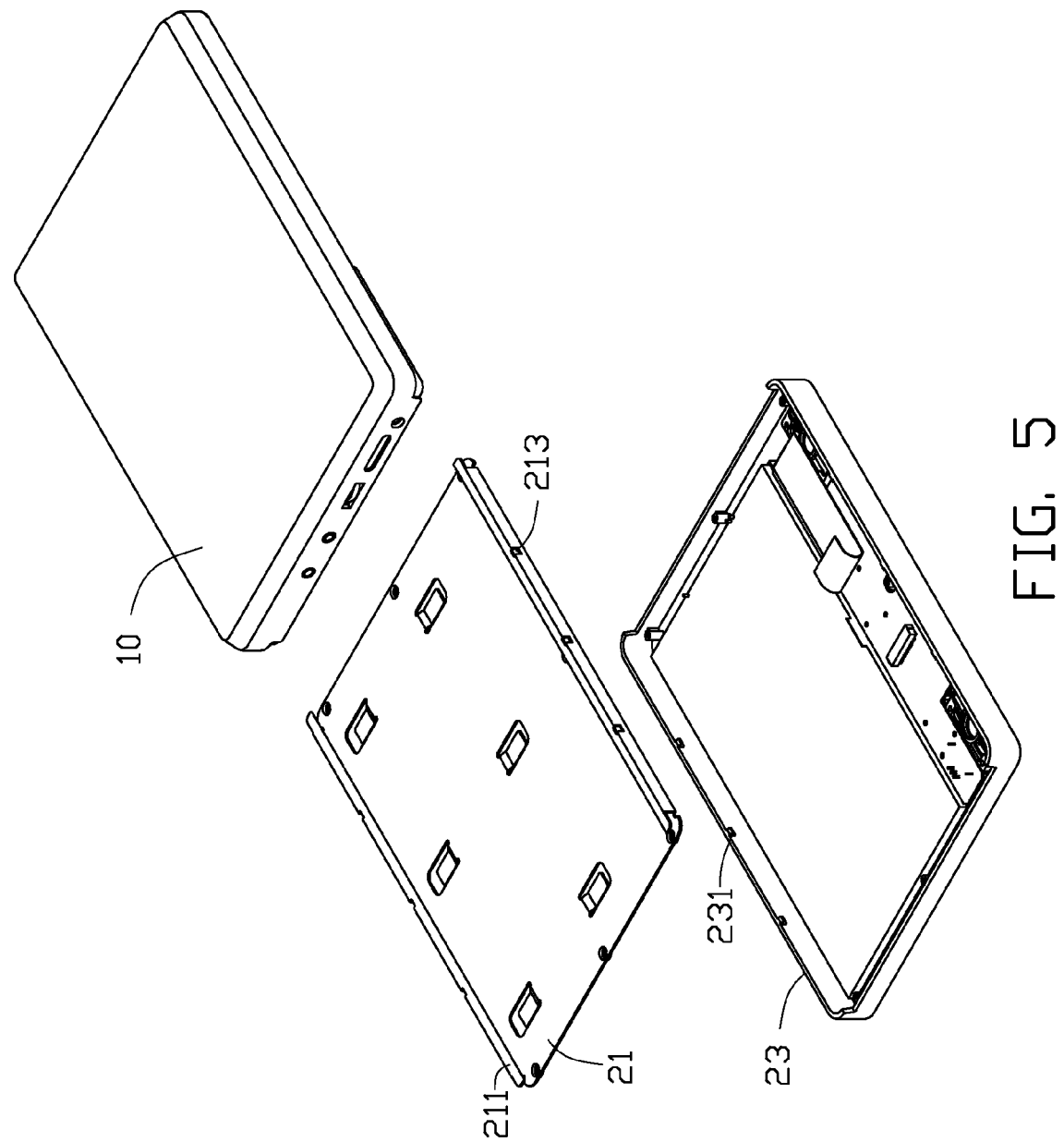
FIG. 5 is an exploded view of the electronic device of FIG. 1 from another side.
Figure 6:
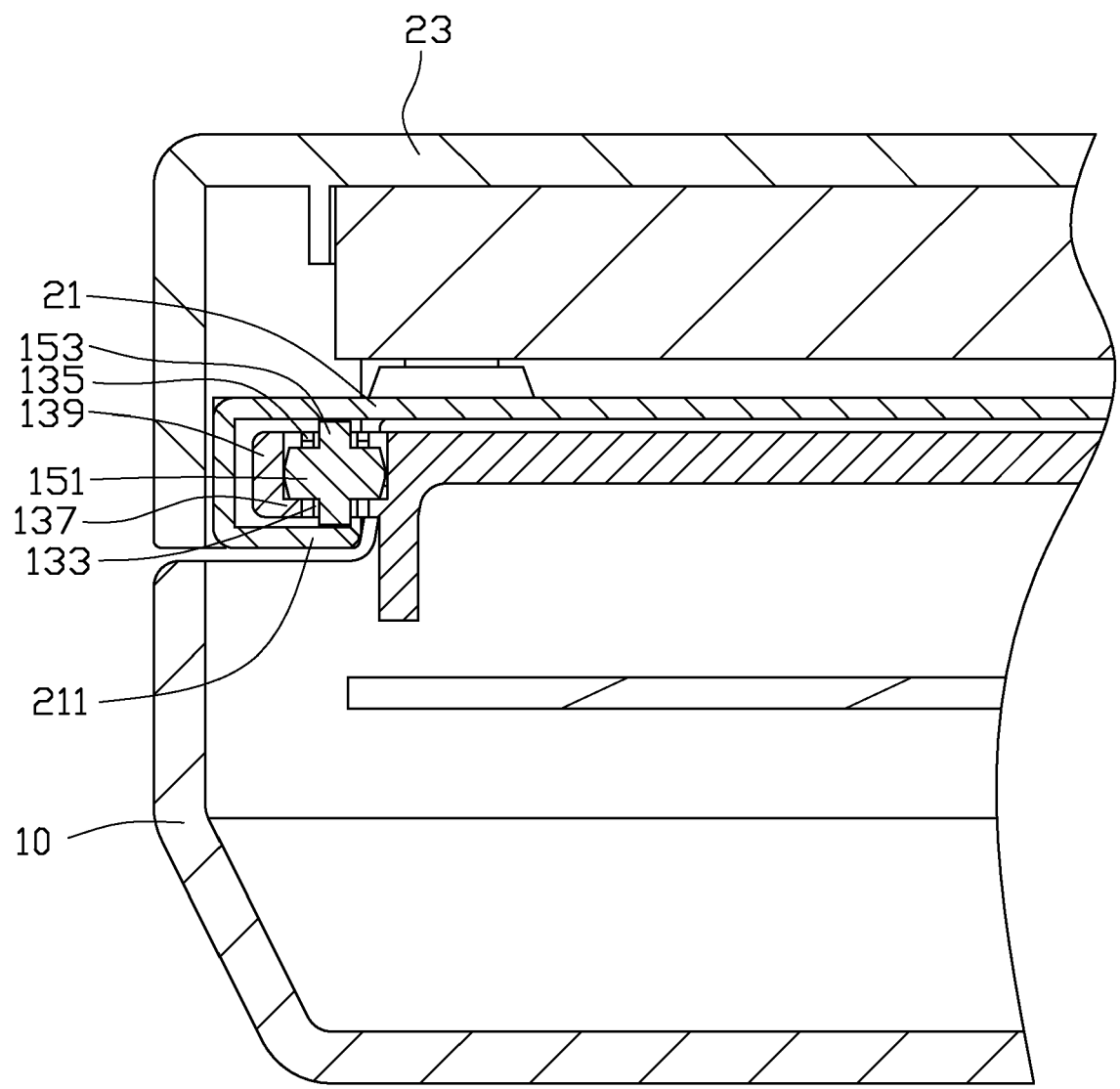
FIG. 6 is a partial cross-sectional view of the electronic device of FIG. 2 along the line VI-VI.

Referring to FIGS. 5 and 6, the lid body 20 includes a base portion 21 and a lid portion 23 fastened with the base portion 21. The base portion 21 is plate-shaped, and opposite flanges are folded in opposite direction to form two parallel guide arms 211 in U-shaped. A receiving space is thus defined in each guide arm 211. Two fixing portion 13 are receiving in the receiving spaces of the two guide arms 211 correspondingly. Opposite ends of the base disk 153 of each wheel 15 extend out of the fixing portion 13 and is in contact with the corresponding guide arm 211, thus the fixing portion 13 avoids contacting the corresponding guide arm 211, a contacting area between the main body 10 and the lid body 20 is minimized.

In addition, each wheel 15 is capable of rotating with respect to the corresponding fixing portion 13 via a rotating frictional force between the base disk 153 of each wheel 15 and the corresponding guide arm 211 when the lid body 20 slides with respect to the main body 10. As a result, when the main body 10 and the lid body 20 slide relative to each other via a rotating frictional force instead of a sliding frictional force, thereby abrasion between the main body 10 and the lid body 20 is decreased.

The base portion 21 defines a plurality of fastening holes 213 on each guide arm 211. Correspondingly, the lid portion 23 has a plurality of protruding portions 231. The protruding portions 231 cooperate with the fastening holes 213 correspondingly to fasten the lid portion 23 with the base portion 21.

It is to be understood, however, that even though numerous information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device comprising:
   a main body comprising a fixing portion and a rotating component received in the fixing portion; and
   a lid body with a guide arm accommodating the fixing portion and engaging with the fixing portion via the rotating component;
   wherein the fixing portion comprises four interconnected sidewalls and a bottom wall, the four sidewalls and the bottom wall cooperate to define a guide slot in the center of the fixing portion, the bottom wall defines a fixing hole, the rotating component is arranged in the fixing hole and two opposite ends extend out of the fixing portion, the fixing portion also comprises two pairs of hooks arranged on two opposite sidewalls of the fixing portion, the rotating component comprises a base disk received in the fixing hole and two shafts protruding from two opposite sides of the base disk, the two shafts are inserted between two pairs of hooks correspondingly.

2. The electronic device according to claim 1, wherein the rotating component is a wheel rotatable relative to the fixing portion.

3. The electronic device according to claim 1, wherein the rotating component is a wheel and a diameter of the wheel is greater than the height of sidewalls of the fixing portion.

4. The electronic device according to claim 1, wherein the lid body comprising a base portion and a lid portion fastened with the base portion, and the guide arm is formed by a folded flange of the base portion.

5. An electronic device comprising:
a main body with a fixing portion; and
a lid body with a guide arm accommodating the fixing portion;
wherein a rotating frictional force between the fixing portion and the guide arm slides the lid body with respect to the main body; the main body has a rotating component received in the fixing portion, the guide arm engages with the fixing portion by means of the rotating component, the rotating friction is generated between the rotating component and the guide arm; the fixing portion comprises four interconnected sidewalls and a bottom wall, the four sidewalls and the bottom wall surround a guide slot in the center of the fixing portion, the bottom wall defines a fixing hole, the rotating component is arranged in the fixing hole and two opposite ends extend out of the fixing portion; the fixing portion also comprises two pairs of hooks arranged on two opposite sidewalls of the fixing portion, the rotating component comprises a base disk received in the fixing hole and two shafts protruding from two opposite sides of the base disk, the two shafts are inserted between two pairs of hooks correspondingly.

6. The electronic device according to claim 5, wherein a diameter of the base disk is greater than the height of sidewalls of the fixing portion.

7. The electronic device according to claim 5, wherein the guide arm is U-shaped.

8. The electronic device according to the claim 5, wherein the lid body comprising a base portion and a lid portion engaged with the base portion, and the guide arm is formed by folded a flange of the base portion.

9. An electronic device comprising:
a main body with two fixing portions arranged on symmetrical side walls and two rotating components fastened in the fixing portion correspondingly; and
a lid body with two guide arms arranged on two sides accommodating two fixing portions correspondingly;
wherein each fixing portion engages with the corresponding guide arm via the corresponding rotating component; each fixing portion comprises four interconnected sidewalls and a bottom wall, the four sidewalls and the bottom wall cooperate to define a guide slot in the center of the fixing portion, the bottom wall defines a fixing hole, each rotating component is arranged in the corresponding fixing hole and two opposite ends extends out of the corresponding fixing portion; each fixing portion comprises two pairs of hooks symmetrically arranged on two opposite sidewalls of the fixing portion, each rotating component comprises two protruding shafts inserted between two corresponding pairs of hooks.

10. The electronic device according to claim 9, wherein each rotating component is a wheel and a diameter of the wheel is greater than the height of the fixing portion.

11. The electronic device according to the claim 9, wherein each rotating component is capable of rotating relative to the corresponding fixing portion.

12. The electronic device according to the claim 9, wherein the lid body comprising a base portion and a lid portion fastened with the base portion, and the two guide arms are formed by folded symmetrical flanges of the base portion in opposite direction.

13. The electronic device according to the claim 9, the guide arm is U-shaped.

* * * * *